United States Patent [19]

Brown

[11] 4,348,347
[45] Sep. 7, 1982

[54] STRETCH-STAGING OF RESIN-BASED FIBER-IMPREGNATED TAPE

[75] Inventor: Gary G. Brown, Escondido, Calif.

[73] Assignee: The United States of America as represented by the Secretary of the Navy, Washington, D.C.

[21] Appl. No.: 258,120

[22] Filed: Apr. 27, 1981

[51] Int. Cl.³ .............................................. B29C 25/00
[52] U.S. Cl. .................................. 264/231; 264/346; 264/347; 425/445
[58] Field of Search .................. 264/1.3, 1.7, 1.8, 1.9, 264/2.7, 36, 230, 231, 235, 236, 291, 292, 346, 347, 339, 108, 137, DIG. 73, 320, 322; 425/DIG. 53, DIG. 236, 383, 446, 445; 65/287, 273

[56] References Cited

U.S. PATENT DOCUMENTS

| | | | |
|---|---|---|---|
| 2,420,278 | 5/1947 | Yelm | 264/231 |
| 2,486,817 | 11/1949 | Berger et al. | 264/292 |
| 2,517,701 | 8/1950 | Oettinger, Jr. | 264/339 |
| 2,782,458 | 2/1957 | Emmert et al. | 264/137 |
| 3,179,726 | 4/1965 | Perry | 264/286 |
| 3,429,006 | 2/1969 | Mattimol et al. | 425/383 |
| 3,444,289 | 5/1969 | Hedberg et al. | 264/347 |
| 3,608,052 | 9/1971 | Gunn | 264/137 |
| 3,761,558 | 9/1973 | Hnitek | 264/347 |
| 3,954,935 | 5/1976 | Kato et al. | 263/236 |
| 3,961,006 | 6/1976 | Brandij et al. | 264/231 |

FOREIGN PATENT DOCUMENTS 2229548 5/1973 Fed. Rep. of Germany ... 264/DIG. 47

*Primary Examiner*—James B. Lowe
*Attorney, Agent, or Firm*—R. S. Sciascia; Henry Hansen; Armand M. Vozzo, Jr.

[57] ABSTRACT

A stretch-staging method is disclosed for straightening continuous fiber columns impregnated within a resin-based tape material to increase the strength and reliability of the material. The tape material is supported about the circumference of a half-cylindrical fixture and separated therefrom by a thin lubricating film to reduce surface friction. Loads of substantially equal weight are longitudinally applied at opposite ends of the tape material about the fixture, and the combination is heated in an oven to an elevated temperature for a predetermined period of time thereby stretching and staging the tape material so that distorted fiber columns are straightened and retained in a straightened condition as the resin is advanced.

4 Claims, 3 Drawing Figures

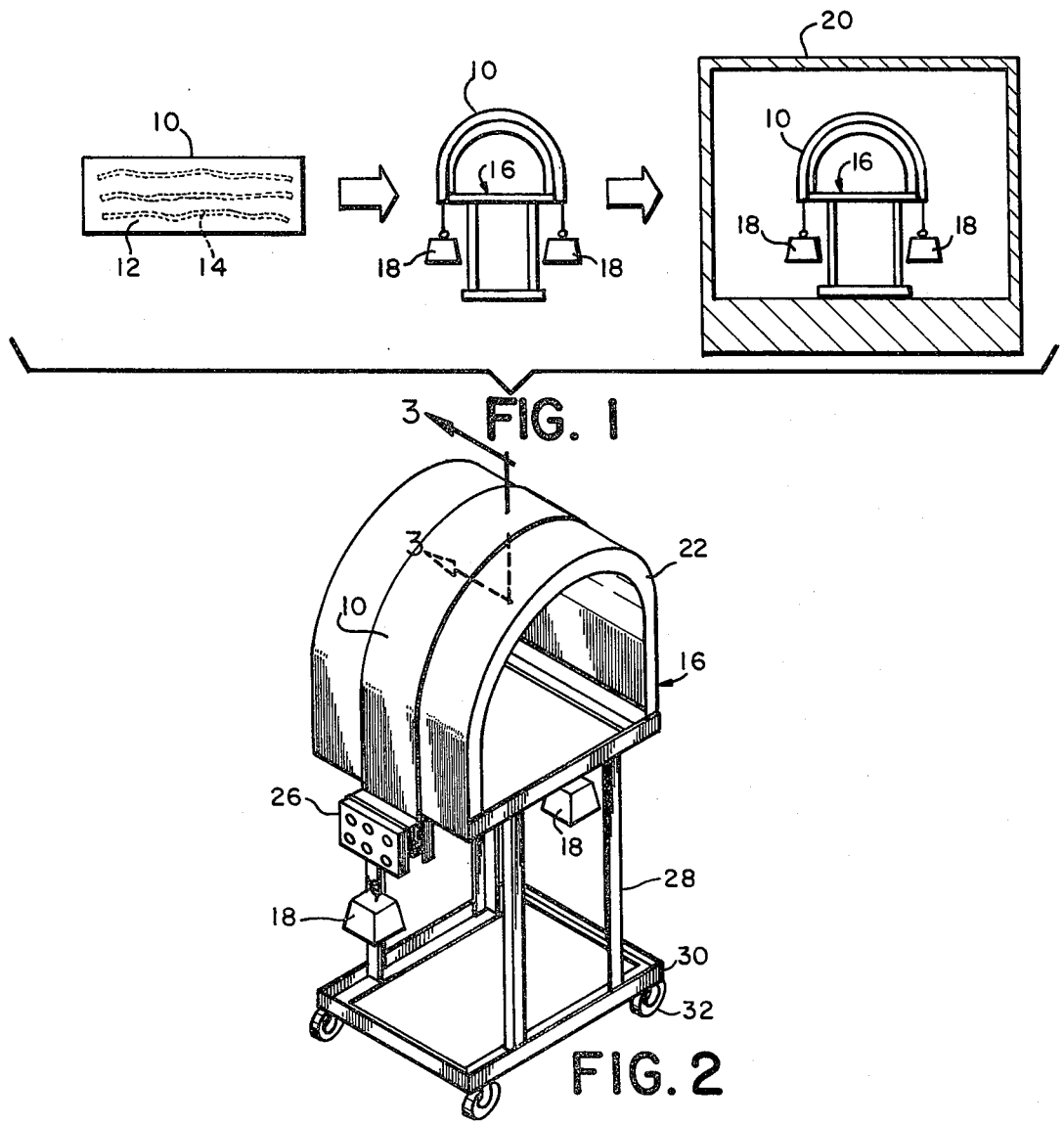
FIG. 1
FIG. 2
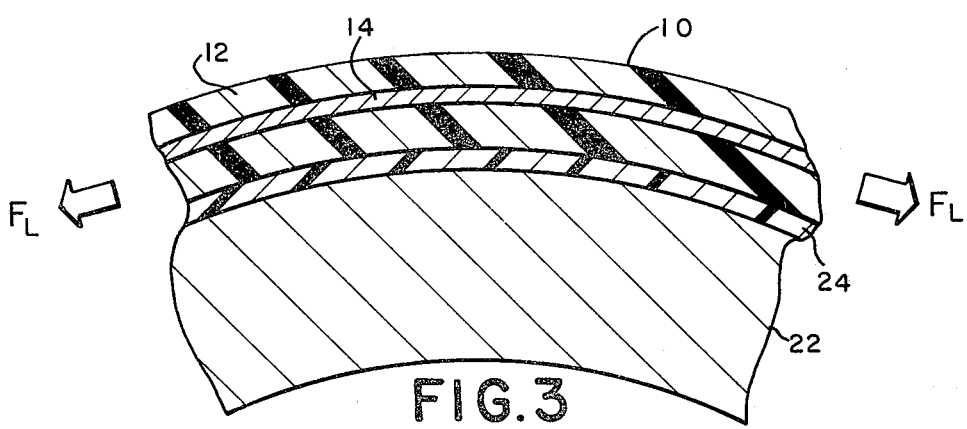
FIG. 3

STRETCH-STAGING OF RESIN-BASED FIBER-IMPREGNATED TAPE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to advanced composite materials of the resin-based type impregnated with continuous filament fibers for structural applications, and more particularly to a method of treatment of such materials in a tape-like form to improve their compression strength.

In the field of advanced composite materials, designallowable static strength values for a given composite material are generally utilized to insure the design of sound structural components. Such design-allowable static strengths are statistically determined on the basis of load tests conducted on a number of specimens of a particular composite material and are indicative of load values at which there is a low probability of material failure. Accordingly, higher design-allowable static strengths are preferred in order to provide the utmost efficiency and reliability in the design and construction of composite material structure.

The values of design-allowable static strengths for a particular composite material are dependent upon both the average static strength of the tested specimens and the extent of scatter or variation of the individual test values. Increases in the average static strength of the composite specimens generally raise the design-allowable static strengths for that particular material, while high coefficients of variation in the load test data, indicative of a large scatter of strength properties, result in low design-allowable values. Composite materials typically demonstrate rather large coefficients of variations which limit their design-allowable values, and such large variation coefficients are particularly evident in those composites of the resin-base type impregnated with fiber columns for structural reinforcement of the resin base. Such impregnated material, commercially available in a tape-like ply that is layered and cured to fabricate a laminated structure, contain misaligned and distorted fiber columns which adversely affect compression strength of the composite specimens in an irregular manner so that a large range of test results, some significantly below expected performance, is produced.

While various processing methods have been investigated and developed for the precured treatment of such fiber-impregnated, resin-based materials, none have been entirely satisfactory in overcoming the problem of the misaligned and distorted fiber columns that reduce the design-allowable static strength values of the material. In particular, the tape-like form of such composite materials has been susceptible to substantial separation, called "brooming", of the individual tows of the fiber-impregnated material during previous attempts to straighten the fiber columns.

SUMMARY OF THE INVENTION

Accordingly, it is a general purpose and object of the present invention to provide an improved processing method for strengthening composite material of the resin-based type impregnated with continuous fiber columns so that the load-carrying capacity and structural reliability of the material is increased.

A further object of the present invention is to provide a processing method for increasing the design-allowable static strength values of a continuous fiber-impregnated, resin-based composite material in a tape-like form by improving the average compression strengths of material specimens under load test and by reducing the scatter of their strength properties.

A still further object of the present invention is to provide a simple and economical processing method that straightens the continuous fiber columns impregnated within precured resinous tape without adversely affecting the integrity of the tape and that is easily incorporated into existing processing schemes.

Briefly, these and other objects of the present invention are accomplished by a stretch-staging method for straightening continuous fiber columns impregnated within a resin-based tape material to increase the strength and reliability of the material. The tape material is supported about the circumference of a half-cylindrical fixture and separated therefrom by a thin lubricating film to reduce surface friction. Loads of substantially equal weight are longitudinally applied at opposite ends of the tape material about the fixture, and the combination is heated in an oven to an elevated temperature for a predetermined period of time thereby stretching and staging the tape material so that distorted fiber columns are straightened and retained in a straightened condition as the resin is advanced.

For a better understanding of these and other aspects of the present invention, reference may be made to the following detailed description taken in conjunction with the accompanying drawing in which like reference characters designate like items throughout the figures thereof.

BRIEF DESCRIPTION OF THE DRAWING

FIG. 1 is a processing diagram illustrating the stretch-staging method in accordance with the present invention;

FIG. 2 is a perspective view of a loading fixture utilized in the stretch-staging method shown in FIG. 1;

FIG. 3 is a sectional view of the loading fixture of FIG. 2 taken along the line 3—3 shown therein.

DESCRIPTION OF THE PREFERRED EMBODIMENT

Referring now to FIG. 1, there is shown the stretch-staging method of the present invention utilized to improve the strength and reliability of a composite material of the type having a resin base impregnated with fiber columns. The composite material, commercially supplied in a precured state in the form of a tape 10, is of a standard width, usually three to twelve inches, and a thickness typically about 0.005 to 0.007 of an inch. Tape 10 is pliable and composed of a resin base material 12, typically epoxy, which is filled with a multiplicity of very fine filaments, generally of graphite, unidirectionally set in longitudinal fiber columns 14 throughout the resin base. One such commercially available tape 10 is AS3501-6 graphite/epoxy prepreg manufactured by the Hercules Corporation.

A length of tape 10 cut for fabrication of a particular laminated structure is longitudinally positioned about the circumference of a substantially half-cylindrical fixture 16, described in greater detail hereinbelow with regard to FIG. 2, with the ends of the tape being coupled to a pair of weights 18 on diametrically opposed sides of the fixture. The pair of weights 18 which apply a longitudinal load force $F_L$ to both ends of tape 10 for stretching, are of substantially equal values, each weight being, for example, in the range of about eight to twelve pounds per inch width of the tape. It should be understood that higher values for weights 18 may be employed to provide greater longitudinal load forces $F_L$ for stretching tape 10, but further noted that total weights in excess of one thousand pounds should be avoided to preserve the integrity of the tape.

Loaded upon and supported by fixture 16, tape 10 is placed in a conventional oven 20, preferably of the air-circulating type. Oven 20 is then heated to an elevated temperature, preferably in the range of about 200° to 250° F., and maintained thereat for a predetermined period of time, typically about fifteen to twenty minutes and not to exceed thirty minutes at the high end of the preferred range of elevated temperatures. Such a gradual heating of tape 10 effects a process typically known as staging wherein the resin base 12 is advanced to a staged level beyond that at which the tape is supplied but below a level of complete cure.

Staging of the impregnated resin base 12 initially causes the resin to soften, typically at about 105° to 110° F., allowing the fiber columns 14 to be straightened by the longitudinal load forces $F_L$ applied to tape 10 via weights 18. With continued staging, the fiber columns 14 become retained in a straightened condition within the resin base 12 as it increases in viscosity and stiffens due to a catalytic curing reaction which starts to occur within the tape 10, usually at about 185° to 190° F. Further heating in oven 20 at the maintained elevated temperature continues but does not complete the catalytic curing reaction, and the staging of the resin base 12 is advanced to a level where, after individual plies of the tape 10 are removed at room temperature from fixture 16 and stacked as a laminated structure, the plies fuse together during final curing with a very limited amount of flow or filament migration. Excessive flow of the resin base 12 during cure may allow the straightened fiber columns 14 to relax and return to their original prestaged condition.

Referring now to FIGS. 2 and 3, tape 10 is shown positioned and loaded upon fixture 16 in accordance with the present invention. Fixture 16 includes a substantially half-cylindrical drum 22 having the outer surface thereof upwardly-facing to provide curved transverse support for tape 10 when it is mounted and loaded thereon. The drum 22 is erected upon a set of leg members 28 and supported by a frame-like base 30. The drum 22 and its associated supporting structure, leg members 28 and base 30, are fabricated of a durable, heat-resistant metal, such as aluminum or an alloy thereof. A set of rollers 32 rotatably connected to base 30 may be used to provide mobility to fixture 16.

Drum 22 is of a relatively large radius of curvature, preferably about two feet or more, to increase the circumference of its peripheral surface and accordingly, the lengths of tape 10 supported thereon. It should be noted that increasingly larger radii may be employed along with lesser cylindrical sectors than that shown and described with regard to drum 22 so that the stretch-staging method of the present invention may be effectively incorporated into a continuous processing line for the fiber-impregnated, resin-based tape 10.

A thin film 24 of a lubricating material, such as Teflon, is deposited in a conventional manner upon the outer surface of drum 22, separating the drum from tape 10. The lubricating film 24 is formed having a radial thickness of about 0.001 to 0.002 of an inch and serves to minimize the surface friction between the tape 10 and drum 22.

A pair of clamps 26 are used to couple the weights 18 to respective ends of tape 10. The clamps 26, which may be of a conventional nature, should extend across the entire width of tape 10 so that the ends of the tape are completely secured and the longitudinal load forces $F_L$ applied by weights 18 are distributed uniformly across the tape. Conventional means are used to affix the weights to the respective clamps 26.

Further information concerning the present invention, particularly regarding test results of the above-described stretch-staging method and a comparison with baseline test data, is given in Brown, G. G., "Methods to Reduce Scatter of the Strength Properties of Advanced Composite Materials", presented at the twenty-fifth Symposium and Exhibition of the Society for the Advancement of Material and Process Engineering (SAMPE), San Diego, CA, May 6-8, 1980, and reported in the proceedings thereof, Vol. XXV, 1980, pp. 259-268.

Therefore, it is apparent that the disclosed invention provides an improved processing method for strengthening composite material of the resin-based type impregnated with continuous fiber columns so that the load-carrying capacity and structural reliability of the material is increased. Furthermore, the disclosed stretch-staging method increases the design-allowable static strength values of such composite material in a tape-like form by improving the average compression strengths of material specimens and by reducing the scatter or variation of their strength properties. In addition, the present invention provides a simple and economical processing method that straightens the continuous fiber columns impregnated within precured resinous tape without adversely affecting the integrity thereof and that is easily incorporated into existing processing schemes associated with the tape.

Obviously, other embodiments and modifications of the present invention will readily come to those of ordinary skill in the art having the benefit of the teachings presented in the foregoing description and drawing. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed:

1. A method for strengthening a length of resinous tape impregnated with continuous fiber columns, comprising the steps of:
    supporting the tape in a continuous curve along the entire length of the tape;
    stretching the tape at the ends thereof in the direction of fiber columns; and
    staging the tape, while being supported and stretched, so that the fiber columns are straightened and retained in a straightened condition thereafter.

2. A strengthening method as recited in claim 1, wherein said step of supporting comprises:
    coating an upwardly-facing convex surface with a lubricating film; and laying the tape in a continuous curve about the coated surface.

3. A strengthening method as recited in claim 2, wherein said step of stretching comprises:
clamping the tape transverse to the direction of the fiber columns near the end of the coated surface; and
weighting the clamped taped to apply a load force thereupon in in the direction of the fiber columns.

4. A strengthening method as recited in claim 3, wherein said step of staging comprises:
heating the tape to an elevated temperature for a predetermined period of time to gradually advance curing of the resinous content of the tape.

* * * * *